United States Patent [19]
Hunter et al.

[11] Patent Number: 5,920,721
[45] Date of Patent: Jul. 6, 1999

[54] COMPILER GENERATING FUNCTIONALLY-ALIKE CODE SEQUENCES IN AN EXECUTABLE PROGRAM INTENDED FOR EXECUTION IN DIFFERENT RUN-TIME ENVIRONMENTS

[75] Inventors: David P. Hunter, Mountain View, Calif.; William K. Colgate, Issaquah, Wash.; Richard L. Sites, Menlo Park, Calif.; Thomas Van Baak, Bellevue, Wash.

[73] Assignee: Digital Equipment Corporation, Maynard, Mass.

[21] Appl. No.: 08/873,147

[22] Filed: Jun. 11, 1997

[51] Int. Cl.[6] ....................................................... G06F 9/45
[52] U.S. Cl. ............................................................. 395/705
[58] Field of Search ..................................... 395/706, 500, 395/712, 800, 700, 300, 200, 705

[56] References Cited

U.S. PATENT DOCUMENTS

| | | | |
|---|---|---|---|
| 4,791,558 | 12/1988 | Chaitin et al. | 364/200 |
| 4,853,872 | 8/1989 | Shimoi | 364/300 |
| 5,339,422 | 8/1994 | Brender et al. | 395/700 |
| 5,430,878 | 7/1995 | Straub et al. | 395/700 |
| 5,446,899 | 8/1995 | Brett | 395/705 |
| 5,546,586 | 8/1996 | Wetmore et al. | 395/705 |
| 5,604,905 | 2/1997 | Tevanian et al. | 395/706 |
| 5,634,114 | 5/1997 | Shipley | 395/500 |
| 5,671,431 | 9/1997 | Knopp | 395/800 |
| 5,675,803 | 10/1997 | Preisler et al. | 395/705 |
| 5,701,442 | 12/1997 | Ronen | 395/500 |
| 5,732,275 | 3/1998 | Kullick et al. | 395/712 |
| 5,774,728 | 6/1998 | Breslau et al. | 395/706 |

OTHER PUBLICATIONS

DelRossi, Robert A. It's in there: Watcom's powerful compiler targets multiple platforms. InfoWorld Journal. v18 n20 p. 98, May 13, 1996.

*Primary Examiner*—Robert W. Downs
*Assistant Examiner*—Wei Zhen
*Attorney, Agent, or Firm*—Hamilton, Brook, Smith & Reynolds

[57] ABSTRACT

A compiler-loader system enables the creation of different loaded executable images in target computers complying with different versions of an instruction-set architecture, the different images being created from a single executable program on secondary storage. The compiler generates an executable program containing a routine executable on both versions of the target computers, and also containing an architecture entry with (i) an address of the program location from which the routine is called, (ii) an instruction executable on only one version of the target computers that performs the same function as the routine but with superior performance, and (iii) a value indicating which version of the target machines the instruction can be executed on. The loader determines whether the target machine can execute the instruction, and if so replaces the subroutine call appearing at the address in the architecture entry with the instruction appearing in the architecture entry.

20 Claims, 1 Drawing Sheet

COMPILER GENERATING FUNCTIONALLY-ALIKE CODE SEQUENCES IN AN EXECUTABLE PROGRAM INTENDED FOR EXECUTION IN DIFFERENT RUN-TIME ENVIRONMENTS

FIELD OF THE INVENTION

The invention is directed generally to the field of computers and computer architecture. More particularly, the invention is directed to compilers, loaders and similar computer programs that generate computer-specific program code for computers having differing instruction sets or other architecture features.

BACKGROUND OF THE INVENTION

As computer architectures evolve, new instructions and other features are added to them. Newer computers and the software (programs) written for them are able to use these newer instructions and features to achieve advantages not available to older computers of the same architecture. It is thus desirable for newer programs, or newer versions of programs, to use new instructions. However, it is also generally desirable that newer programs be executable on older computers as well as on newer ones, i.e., that they be backwards compatible. The software vendor can sell programs to customers having a range of versions of hardware, yet need support only one version of each such program. Customers can buy one version of a program, and it will run on their hardware regardless of which version the hardware is. And customers who desire to use the program in a so-called "heterogeneous" environment, i.e., a computer cluster or collection consisting of both older and newer computers that all need the ability to run the program, need install and maintain only a single version of the program. Thus a general goal of computer designers is promoting use of new instructions, which improves computer system performance, while at the same time providing backwards compatibility so that a new or updated program will be widely usable.

One way this general goal has been approached in the past may be referred to as "trap and emulate". In this scheme, the executable program is compiled using one or more new instructions, and an updated operating system software module is provided for use on computers on which the executable program is to be executed. When an older computer attempts to execute a new instruction, an illegal instruction trap occurs by design of the central processor. The trap vector points to the updated operating system module, referred to as a trap handler. The trap handler examines the illegal instruction, and determines that it is a newer instruction that will correctly execute only on a newer computer. It then launches a routine that emulates the new instruction in software. On completion of the emulation routine, program control is returned to the executable program at the instruction following the new instruction.

The "trap and emulate" solution described above suffers from drawbacks that make it unattractive. One drawback is the requirement that the operating system be updated whenever new instructions are added to the architecture and used in executable programs. Another significant drawback is performance. There is a large penalty, on the order of a hundred processor clock cycles, for taking a trap. In fact, the performance on the older computer is generally worse than that of the original program that lacked the newer instructions. The trap-and-emulate solution, therefore, does not adequately address the desire to maintain high performance on the older computers while achieving backwards compatibility.

SUMMARY OF THE INVENTION

There has been room, then, in the prior art for schemes that provide for the use of new instructions by newer versions of computers, while maintaining backwards compatibility with older versions of the computers, and also minimally impacting the performance of the older versions of the computers. These are general goals addressed by the present invention.

The present invention in a broad sense includes a compiler that generates an executable program that can be run in different run-time environments, where the different run-time environments may for example be computers with different versions of an instruction-set architecture. The compiler generates code sequences in the executable program, each code sequence performing a function required by a portion of a source program from which the executable program is generated. Each code sequence is better suited for execution in a corresponding one of the run-time environments than are the other code sequences, and the code sequences are generated in a manner enabling execution of the better-suited code sequence in each of the run time environments.

For example, the executable program may be intended for execution on two different versions of computers, one newer and one older. In this case, the compiler generates two code sequences. One of the code sequences is a new instruction that can be executed on only the newer computers, and the other sequence is a routine that performs the same function as the instruction but that can be executed on the older computers as well as on the newer ones.

An executable program thus generated by such a compiler can be easily modified at run time so that the better-suited code sequence is executed. For example, a cooperating entity such as a loader program can patch in the better-suited code sequence, i.e., modify the flow of program control so that the better-suited code sequence is executed. Thus the newer instruction can be used on newer computers, and the routine on older computers, without the need for a trap or other similarly inefficient mechanism.

An advantageous aspect of the present invention is that one of the code sequences can be generated in a manner providing for its default execution. Thus the executable program can be executed in an environment where the loader program may be an older program that is oblivious to the other code sequence and the possibility of patching the executable. The executable program will nonetheless run correctly, if the default code sequence that is generated is the backwards-compatible code sequence.

The present invention in another aspect is a compiler that generates, along with the code sequences, additional information in the executable program including (i) an address specifying a program location in the executable program at which the function required by the portion of the source program is to be performed; and (ii) a value indicating in which run-time environment the execution of one of the code sequences is better suited. This additional information makes it possible for fast and efficient patching of the executable program by a cooperating entity at image activation time.

Other objects, features, and advantages of the present invention will be illustrated by the detailed description that follows.

BRIEF DESCRIPTION OF THE DRAWINGS

An embodiment of the invention is described with reference to the accompanying drawings, in which.

DETAILED DESCRIPTION

Figure 1:
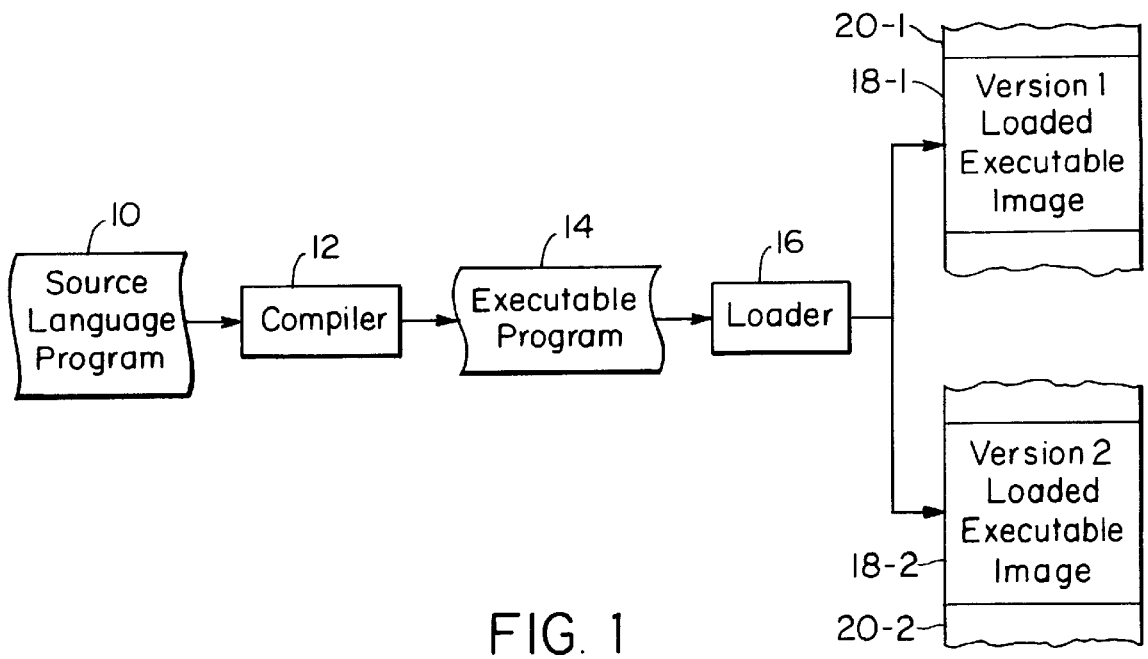
FIG. 1 is a block diagram of a program compiling and loading scheme according to the principles of the present invention.

FIG. 1 illustrates a scheme embodying the present invention by which computer programs are prepared and loaded into a target computer for execution. A source-language program 10 written in a high-level language is operated upon by a compiler 12 that converts the natural-language-like constructs of the source program 10 into object-code constructs, such as instructions and data, that are more readily understood by a digital computer. The collection of object-code constructs generated by the compiler 12 is referred to as an executable program 14. The executable program 14 is normally saved as an image in non-volatile storage, such as a file on a magnetic disk, for subsequent execution. For example, the executable program 14 may reside on and be accessed via a network server.

In the embodiment of FIG. 1, the executable program 14 is intended to be run on either of two different computers, the actual one being unknown at compile time. For purposes of this description, these computers are referred to as Version 1 and Version 2. When the executable program 14 is to be run, a loader 16 processes the executable program 14 in order to create a loaded executable image in the target computer on which the loader is running. If the target computer is a Version 1 computer, the loader 16 creates a Version 1 loaded executable 18-1 in the memory 20-1 of the Version 1 computer. If the target computer is a Version 2 computer, the loader 16 creates a Version 2 loaded executable 18-2 in the memory 20-2 of the Version 2 computer. After loading is complete, program control is transferred to the loaded executable image 18-1 or 18-2 in a conventional fashion to begin its execution.

In the following description, specific examples of Version 1 and Version 2 computers are used to illustrate the principles of the present invention. These examples are drawn from the Alpha™ family of computers manufactured and sold by Digital Equipment Corporation. Earlier and later members of this family are distinguishable with regard to some of the instructions they use for processing data of certain types. A specific case is the processing of byte (8-bit) data types. The Alpha architecture specifies flat 64-bit virtual memory addressing, so that the natural width of a memory word in Alpha implementations is 64 bits. Partly for this reason, in the design of an early version of the Alpha architecture (hereinafter referred to as Version 1), the instructions for moving data between registers and memory (load and store instructions) are limited to handling primarily quadword (64-bit) data types, although instructions for longword (32-bit) data types also exist. To handle byte (8-bit) data types, as well as 16-bit data types called words, the Version 1 Alpha architecture provides instructions for manipulating bytes within one of several 64-bit general-purpose registers.

To perform a byte store operation, a version 1 Alpha computer executes a set of instructions. These include a quadword load instruction to bring the quadword containing the byte into a register; instructions that insert or extract the byte in the desired position in the register; and a quadword store instruction to put the data (containing the new byte) back into memory.

In a later version of the Alpha architecture (referred to hereinafter as Version 2), instructions exist that perform byte and word loads and stores directly. The use of these instructions simplifies, and in some cases increases the performance of, programs having byte and word variables.

The Version 2 architecture is what is referred to as a "superset" of the Version 1 architecture; that is, in addition to the new instructions, it also contains all the instructions of Version 1. Therefore a byte store operation can be carried out on a Version 2 Alpha computer in the same manner as described above for a Version 1 Alpha computer. And in fact, programs written and compiled for Version 1 computers can execute unmodified on Version 2 computers. However, it is preferable for a program executing on a Version 2 Alpha computer to use the new byte and word instructions instead of the older method described above.

The various elements shown in FIG. 1 cooperate to achieve this goal. One key element is the compiler 12 that generates the executable program 14. The functionality of the compiler 12 is explained below primarily with reference to the structure of the executable program 14 that it generates. Suitable means for implementing the compiler 12 will be apparent to those skilled in the art from the description presented here.

Appendix A contains a listing of a simple program "Example" showing the structure of the executable program 14 that is generated from the source program 10 listed in Section 1 of the listing. The elements appearing in the listing of Appendix A are now described in some detail.

The Example program contains a subroutine called "s1" that performs a simple copying of a variable b to another variable a. The variables a and b are declared as bytes. Because a and b are byte-type variables, the assignment "a=b" appearing in subroutine s1 is preferably implemented differently on Version 1 Alpha computers than on Version 2 Alpha computers. This is because of the lack of byte load and store instructions in Version 1 computers, as discussed above.

Section 2 of the listing shows how the executable program 14 is structured to handle this requirement for different Alpha implementations. The main part of the program, beginning at relative program location 0000, performs a load quadword instruction (ldq_u) to bring the quadword containing the byte b into general purpose register t0, and then performs an extract byte instruction (extbl) to place that byte in the lowest-order position within t0. At this point, it is necessary to store byte b thus placed in to into memory at the address of byte a in order to complete the assignment function. To accomplish the required store byte function, a branch to subroutine (bsr) is executed to a routine labeled stb_routine; this routine performs the store byte operation as described below. Upon completion of the subroutine stb_routine, the byte assignment "a=b" has been completed; a return instruction (ret) then implements the return from subroutine s1.

The routine stb_routine begins with a load quadword instruction that brings the quadword containing the byte a into register t11. It then performs an insert byte instruction (insbl) that places the byte b (from t0) into register t12 at a position dictated by the lower-order bits of the address a0, t12 otherwise containing a field of zeros. The mask instruction (mskbl) clears the bits of register t11 that make up byte a, so that t11 holds the quadword in which a used to be located but with a "hole" of consecutive zeros where a used to be. The logical sum instruction (bis) then inserts byte b into the hole, so that t11 then holds the same quadword as originally loaded but with b in place of a. Finally this quadword is written back into memory using the store quadword (stq) instruction. The net effect, of course, is that the single byte a in memory has been replaced by the byte b.

The flow of execution of the Example program as it appears in Appendix A is from location 0000 in the s1 subroutine through the bsr at 0008, then from location 0010 in stb_routine through location 0024, and finally back to location 000C in s1. This sequence performs a byte load/store pair in a manner that can execute on either a Version 1 or Version 2 Alpha computer. This is the default code sequence that is executed in the absence of modification of the executable program 14.

Section 3 of the listing shows a section called the architecture section. This is a separate section of the executable program 14 that contains information enabling the loader 16 to create different loaded executable images 18-1 and 18-2. There are three important items shown in the listing: a version-indicating value (0002), an address (0008), and an instruction (stb t0, (a0)). These three items make up an architecture entry that, by virtue of the address 0008 appearing in it, is associated with the bsr instruction at location 0008. In general, there is one architecture entry for each assignment operation required by the source program 12; since Example has only one such assignment, there is only one architecture entry shown in the architecture section. The version-indicating value in the architecture entry enables the loader to determine whether the target computer on which it is running is capable of executing the instruction appearing in the architecture entry. The address enables the loader to identify the calling point for stb_routine. And the instruction is placed in the architecture entry so that it can be easily identified and retrieved by the loader.

As is described below, the loader 16 modifies the executable program 14 shown in Appendix A when it is to be executed on a Version 2 Alpha computer. In particular, the loader replaces the "bsr" instruction appearing at location 0008 with the "stb" instruction appearing in the architecture section. The resulting modified program performs the same assignment operation called for by the source program, but has a different flow of execution. The modified program simply executes straight through to the return at location 000C; the subroutine "stb_routine" is never called.

The replacement described above must be done in a fashion so that the flow of execution of the executable program is not interfered with. In the Alpha architecture, all instructions are the same size, 32 bits. Therefore, one instruction may be replaced by another without creating or filling gaps in the instruction stream. In other architectures or replacement schemes, it may be necessary to account for subsequent replacement when generating the default sequence. For example, it may be necessary to generate no-operation (NOP) commands in the instruction stream adjacent to the default instruction if the replacement instruction is larger than the default instruction. Such techniques are well known in the art.

It should be noted that the program Example as it appears in Appendix A can execute without modification on Version 1 Alpha computers. Thus, it may be loaded into memory even by a loader program that is oblivious to the architecture information and the possibility of patching in the stb instruction. This is an additional measure of backwards compatibility that this arrangement of the code sequences achieves.

Figure 2:
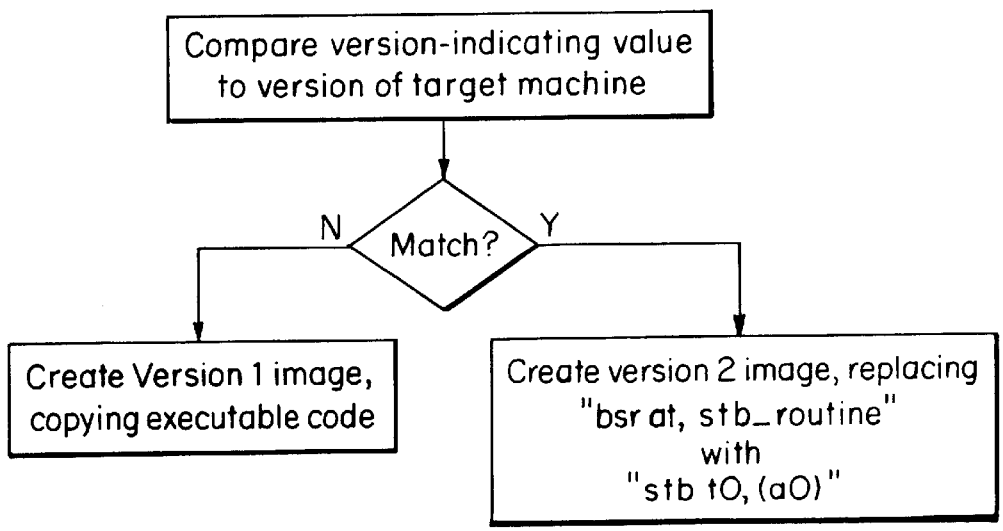
FIG. 2 is a flow diagram showing the operation of a loader program in the scheme of FIG. 1 with respect to the present invention.

Turning now to FIG. 2, the operation of the loader 16 with respect to the present invention is described. During the loading process, the loader 16 accesses the architecture section of the executable program 14. It compares the version-indicating value that it finds there with information in the target computer environment that specifies the version of the target computer. In the Alpha architecture, this information is available via an amask (architecture mask) instruction. If the version of the target computer does not match that specified by the value in the architecture section, then the target computer cannot execute the instruction stored in the architecture section. In this case, the loader creates a Version 1 loaded executable image 18-1 by simply copying the executable code shown in Appendix A from the executable program 14 into memory 20-1 unmodified. If, however, the version of the target computer does match that specified by the value in the architecture section, the target computer is capable of executing the instruction stored in the architecture section. In that case, the loader 16 creates a Version 2 loaded executable image 18-2. The loader obtains the address and the instruction stored in the architecture section. Then, either during or after copying the executable program 14 into memory 20-2, the loader replaces the instruction appearing at the specified address with the instruction obtained from the architecture section.

While the foregoing has described specific features of an embodiment of the present invention, there are many other possible embodiments that fall within its scope. The invention is particularly useful in dealing with the problems created by revisions to an instruction-set architecture; however, it may be applied more generally to achieving beneficial results in any set of dissimilar run-time environments in which an executable program may be executed. Examples of such run-time environments include different operating systems, normal operating mode vs. debug, and different floating-point calculation schemes or desired preciseness. In the illustrated embodiment, the executable program may be run in either of two run-time environments, and two alternative code sequences are generated; the principles of the invention may be extended to allow for execution in three or more different run-time environments, where two, three, or more alternative code sequences may be involved.

The compiler as described relies on an external loader to advantageously process the generated executable image 14, but in alternative embodiments may itself generate code in the executable program that carries out the modification at run-time. In another alternative, the generated routine (such as stb_routine) can be called from multiple locations where the store byte function is required. Such a scheme would require that certain prearranged constraints be placed on the parameters used by the stb instruction; such techniques are known in the art and their use would contribute to greater space efficiency in the generated executable program. Finally, it may make sense in alternative embodiments for the default sequence to be the new instruction rather than the backwards-compatible routine. All these and other embodiments are intended to be described by the claims which follow.

---

APPENDIX "A"
Listing of program "Example"

{Section 1 - Source program listing}
1 subroutine s1 (a, b)
2 byte a, b
3 a = b
4 end -continued APPENDIX "A"
Listing of program "Example"

{Section 2 - Executable program in symbolic format}
```
    s1_:
    0000    ldq_u t0, (a1)      //bring quadword containing b into
                                //register t0
    0004    extbl t0, a1, t0    //extract desired byte; put in least
                                //significant position
    0008    bsr at, stb_routine //call store byte routine
    000C    ret (ra)            //return using register ra as link
    stb_routine:
    0010    ldq_u t11, (a0)     //bring quadword containing a into
                                //reg. t11
    0014    insbl t0, a0, t12   //put byte b in a field of zeros in t12
    0018    mskbl t11, a0, t11  //clear bits constituting byte a in
                                //reg. t11
    001C    bis t11, t12, t11   //bitwise-OR reg. t12 into reg. t11
    0020    stq_u t11, (a0)     //store reg. t11 back into memory
    0024    ret (at)            //return using reg. at as link
```
{Section 3 - Architecture section}
```
    arch_section:
    0000    0002                //value indicating computer version
                                //for which replacement is OK
            0008                //address of bsr to be replaced by stb
            stb t0, (a0)        //instruction to replace bsr with
```

We claim:

1. A method of generating an executable program, comprising the step of generating a plurality of code sequences in the executable program, each code sequence performing a common function required by a portion of a source program from which the executable program is generated, each code sequence being better suited for execution in a corresponding one of different run-time environments than are the other code sequences, the code sequences being generated in a manner enabling execution of the better-suited code sequence in each of the run-time environments.

2. A method according to claim 1, further comprising the step of generating the following information in the executable program: (i) an address specifying a program location in the executable program at which the common function required by the portion of the source program is to be performed; and (ii) for each code sequence performing the common function, a value indicating for which run-time environment the code sequence is better suited.

3. A method according to claim 1, wherein:
the one of the code sequences that is better suited for execution in a predetermined one of the run-time environments is generated in a manner providing for its default execution and for its ready identification by a cooperating entity in another of the run-time environments capable of modifying the executable program to provide for execution of another of the code sequences instead of the one code sequence; and
the other code sequences are generated in a manner providing for their ready identification by the cooperating entity.

4. A method according to claim 3, wherein the cooperating entity is a loader.

5. A method according to claim 1, wherein:
the different run-time environments are two different versions of computers on which the executable program is intended to be executed;
the number of code sequences generated to perform the common function is two;
one of the code sequences is an instruction that is executable on only one version of the computers; and
the other code sequence is a routine that is less efficient than the instruction during execution but is executable on both versions of the computers.

6. A method according to claim 5, wherein the two versions of the computers are distinguished by their compliance with two different versions of an instruction-set architecture, one version of the instruction-set architecture being a later version that is a superset of the other.

7. A method according to claim 5, wherein both versions of the computers have a 64-bit memory architecture, one of the code sequences is a byte store instruction, and the other code sequence is a multiple-instruction routine performing the byte store operation.

8. A method according to claim 1 wherein execution of the better-suited code sequence is enabled by modifying the executable program at run-time so that the better-suited code sequence is executed.

9. A method according to claim 8 wherein modifying the executable program further comprises patching the better-suited code sequence into the executable program.

10. A method according to claim 9 wherein patching is done by a loader program.

11. A method according to claim 1 wherein the different run-time environments are different operating systems.

12. A method according to claim 1 wherein the different run-time environments include normal operating mode and debugging mode.

13. A method according to claim 1 wherein the different run-time environments comprise different respective floating-point calculation methods.

14. A method according to claim 1 wherein the different run-time environments have different desired preciseness.

15. A method according to claim 1 further comprising:
generating code in the executable program, said generated code for patching in the better suited code sequence at run-time.

16. A method according to claim 1 wherein a code sequence is called from multiple locations within the executable program where the common function is required.

17. A method, comprising the steps of:
generating an instruction in an executable program, the instruction performing a function required by a portion of a source program from which the executable program is generated, the instruction being executable on only one of two different versions of computers on which the executable program is intended to be executed;
generating a routine in the executable program, the routine also performing the required function but being executable on both versions of the computers; and
generating an architecture entry in the executable program having (i) an address specifying a program location in the executable program at which the function is required to be performed; and (ii) a value indicating which version of the computers can execute the instruction.

18. A method according to claim 17, wherein the routine is a subroutine callable from the program location specified by the address included in the architecture information, and wherein the instruction is included in the architecture entry, and further comprising the step of generating a call to the subroutine in the executable program at the specified program location, the subroutine call being generated in a manner enabling its subsequent replacement with the instruction without interference to the flow of execution of the remainder of the executable program.

19. A method according to claim 17, wherein both versions of the computers have a 64-bit memory architecture, and wherein the function performed by the instruction and the routine is storing a single byte of data into memory.

20. A method of generating an executable program, comprising:

generating an executable image from a source program, a portion of the source program requiring performance of at least one function; and generating a plurality of code sequences, each code sequence performing a common selected function, each code sequence being better suited for execution in a corresponding one of different run-time environments than are the other code sequences, the code sequences being generated in a manner enabling execution, when the selected function is required to be performed by the executable image, of the better-suited code sequence in each of the run-time environments.

* * * * *